US009023550B2

(12) United States Patent
Brinkman

(10) Patent No.: US 9,023,550 B2
(45) Date of Patent: May 5, 2015

(54) NANOCRYSTALLINE CERIUM OXIDE MATERIALS FOR SOLID FUEL CELL SYSTEMS

(75) Inventor: Kyle S. Brinkman, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 482 days.

(21) Appl. No.: 13/297,826

(22) Filed: Nov. 16, 2011

(65) Prior Publication Data

US 2012/0122014 A1 May 17, 2012

Related U.S. Application Data

(60) Provisional application No. 61/414,127, filed on Nov. 16, 2010.

(51) Int. Cl.
*H01M 4/90* (2006.01)
*H01M 8/12* (2006.01)
*B82Y 30/00* (2011.01)
*B82Y 40/00* (2011.01)

(52) U.S. Cl.
CPC ............... *B82Y 30/00* (2013.01); *B82Y 40/00* (2013.01); *H01M 4/9025* (2013.01); *H01M 8/126* (2013.01); *H01M 2008/1293* (2013.01); *H01M 2300/0074* (2013.01); *Y02E 60/521* (2013.01); *Y02E 60/525* (2013.01)

(58) Field of Classification Search
None
See application file for complete search history.

(56) References Cited

U.S. PATENT DOCUMENTS

| 3,134,697 | A | 5/1964 | Niedrach |
| 4,272,353 | A | 6/1981 | Lawrance et al. |
| 4,686,158 | A * | 8/1987 | Nishi et al. .................... 429/429 |
| 5,211,984 | A | 5/1993 | Wilson |
| 6,514,635 | B2 | 2/2003 | Van Dine et al. |
| 6,635,370 | B2 | 10/2003 | Condit et al. |
| 6,913,845 | B2 | 7/2005 | Bekkedahl et al. |
| 8,623,301 | B1 * | 1/2014 | Deininger et al. ........... 423/21.1 |
| 2003/0027033 | A1 * | 2/2003 | Seabaugh et al. ............... 429/40 |
| 2006/0141137 | A1 * | 6/2006 | Anderson et al. ............ 427/115 |

OTHER PUBLICATIONS

Antolini, Formation of carbon-supported PtM alloys for low temperature fuel cells: a review Mater. Chem. Phys., 78 (2003), 563-573.
Brinkman; "The Oxygen Permeation Properties of Nano-Crystalline $CeO_2$ Thin Films", J. Electrochem. Soc., 157 (2010), B1852-B1857.
Chiang, Y.M., et al., "Defect and transport properties of nanocrystalline $CeO2-x$." Applied Physics Letters, 1996. 69(2): p. 185-187.
Easton et al., "Chemical Modification of Proton Exchange Membrane Fuel Cell Catalysts with a Sulfonated Silane", Electrochem. Solid-State Lett., 4, (2001), A59-A61.
(Continued)

*Primary Examiner* — Jonathan Crepeau
(74) *Attorney, Agent, or Firm* — Dority & Manning, P.A.

(57) ABSTRACT

Disclosed are solid fuel cells, including solid oxide fuel cells and PEM fuel cells that include nanocrystalline cerium oxide materials as a component of the fuel cells. A solid oxide fuel cell can include nanocrystalline cerium oxide as a cathode component and microcrystalline cerium oxide as an electrolyte component, which can prevent mechanical failure and interdiffusion common in other fuel cells. A solid oxide fuel cell can also include nanocrystalline cerium oxide in the anode. A PEM fuel cell can include cerium oxide as a catalyst support in the cathode and optionally also in the anode.

16 Claims, 5 Drawing Sheets

(56) References Cited

OTHER PUBLICATIONS

Hou et al., "Preparing High Loading Pt/C by Modifying the Carbon Support", Electrochem. Solid State Lett., 6 (2003), A232-A235.
Jia et al., "Modification of carbon supported catalysts to improve performance in gas diffusion electrodes" Electrochim. Acta, 46 (2001), 2863.
Kagomiya, et al. "Oxygen Permeable $Ce_{0.8}Gd_{0.2}O_{1.9}$—$CoFe_2O_4$ Thin Films Prepared on Porous $Ce_{0.8}Gd_{0.2}O_{1.9}$ Substrates" Electrochem. Solid-State Lett., 8, A70-73 (2005).
Kangasniemi et al., "Characterization of Vulcan Electrochemically Oxidized under Simulated PEM Fuel Cell Conditions", J. Electrochem. Soc., 151 (2004), E125-E132.
Kinoshita et al., "Determination of carbon surface oxides on platinum-catalyzed carbon", Carbon, 12 (1974), 525-53.
Mathias et al., "Two Fuel Cell Cars in Every Garage" Interface, 14 (2005), 24-35.
Min et al., "Particle size and alloying effects of Pt-based alloy catalysts for fuel cell application" Electrochim. Acta, 45 (2000), 4211-4217.
Mukerjee et al., "Enhanced electrocatalysis of oxygen reduction on platinum alloys in proton exchange membrane fuel cells" J. Electroanal. Chem., 357 (1993), 201-224.
Pyun et al., "Corrosion behavior of platinum-catalyzed carbon in phosphoric acid solutions", Carbon, 32 (1994), 161-4.
Ralph, et al. "Catalysis for Lower Temperature Fuel cells" Platinum Metal Rev., 46 (2002), 3-14.
Reiser et al., "A Reverse-Current Decay Mechanism for Fuel Cells", Electrochem. Solid State Lett., 8 (2005), A273-A276.
Roen et al., "Electrocatalytic Corrosion of Carbon Support in PEMFC Cathodes" Electrochem. Solid State Lett., 7 (2004), A19-A22.
Roman-Martinez et al., "Metal-support interaction in Pt/C catalysts. Influence of the support surface chemistry and the metal precursor" Carbon, 33 (1995), 3-13.
Roy et al., "Spectroelectrochemical Study of the Role Played by Carbon Functionality in Fuel Cell Electrodes" J. Electrochem. Soc., 144 (1997), 2323-28.
Siroma et al., "Imaging of highly oriented pyrolytic graphite corrosion accelerated by Pt particles", Electrochem. Comm., 7 (2005) 1153-1156.
Stevens et al., "Thermal degradation of the support in carbon-supported platinum electrocatalysts for PEM fuel cells", Carbon, 43 (2005), 179-188.
Stonehart et al., "Stability of acid-fuel-cell cathode materials. Work Period: Jan. 1, 1978-Dec. 31, 1979", Report No. EM-1664, Research Project RP 1200-2. Electric Power Research Institute, Palo Alto, CA, Jan. 1981.
Tang et al., "PEM fuel cell carbon corrosion due to the formation of air/fuel boundary at the anode" J. Power Sources, (2006) 1306-1312.
Tschope, et al., "Grain size dependence of Electrical conductivity in polycrystalline cerium oxide" J. Electroceram., 7, 169-77 (2001).
Willsau et al., "The influence of Pt-activation on the corrosion of carbon in gas diffusion electrodes—A dems study" J. Electroanal. Chem. Interfacial Electrochem., 161 (1984), 93-101.
Xu et al., "Advanced Fuel Cell Catalysts" Electrochem. Solid-State Lett., 6 (2003), A171-73.
Xu et al., "High performance carbon-supported catalysts for fuel cells via phosphonation" Chem. Commun. (Cambridge), (2003), 878-79.
Xu et al., "Superior Catalysts for Proton Exchange Membrane Fuel Cells" Electrochem. Solid-State Lett., 8 (2005), A313-A315.

* cited by examiner

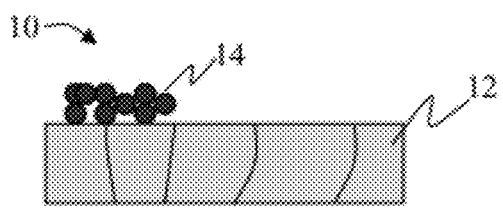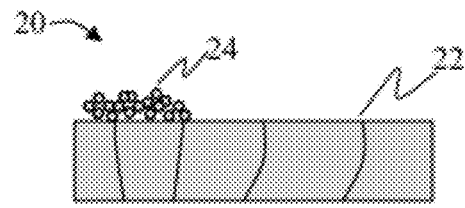
FIG. 1A
Prior Art
FIG. 1B
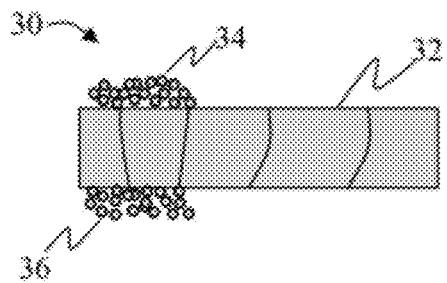
FIG. 1C
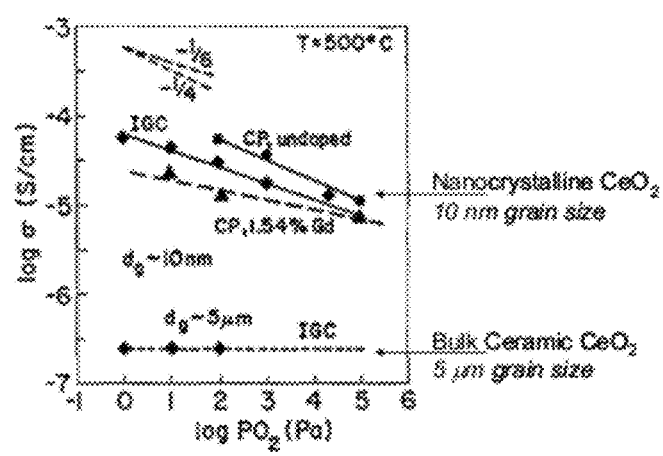
FIG. 2

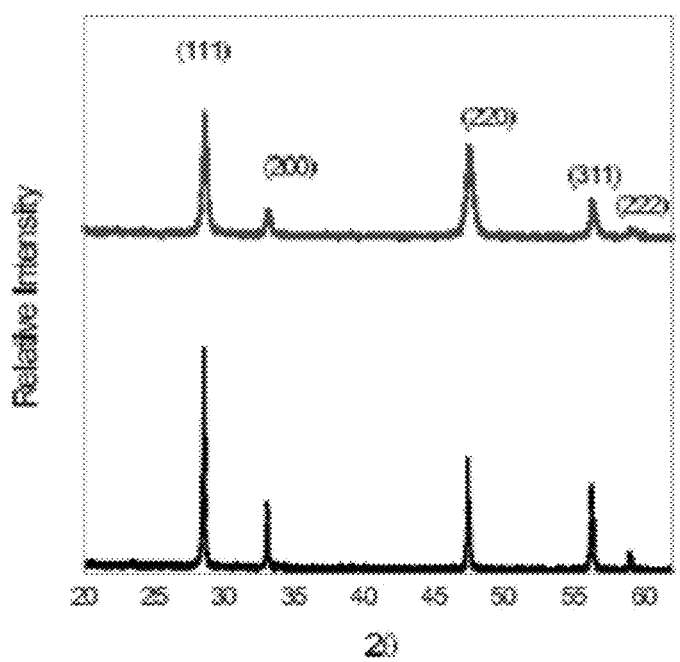
FIG. 5B
FIG. 5A
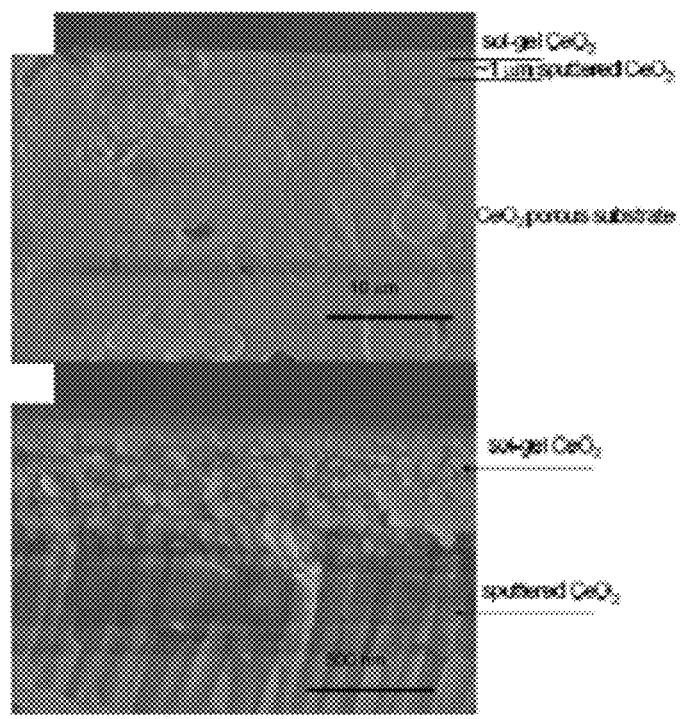
FIG. 6A
FIG. 6B

NANOCRYSTALLINE CERIUM OXIDE MATERIALS FOR SOLID FUEL CELL SYSTEMS

CROSS REFERENCE TO RELATED APPLICATION

This application claims filing benefit of U.S. Provisional Patent Application Ser. No. 61/414,127 having a filing date of Nov. 16, 2010 entitled "Zero Interface Cathode/Electrolyte Structure Based on Bulk and Nanocrystalline $CeO_2$ Materials for SOFC Systems," which is incorporated herein in its entirety by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed to an improvement in energy conversion devices such as solid oxide fuel cells. The invention discloses the use of specialized nanocrystalline materials having a controlled grain size so as to provide enhanced electronic connectivity while resisting cracking and other mechanical failures which can otherwise occur by thermal expansion of traditional cathodes, electrolytes and/or anodes.

BACKGROUND OF THE INVENTION

Solid oxide fuel cells (SOFC) and other similar energy conversion devices are often utilized at extreme operating conditions and will frequently experience integrity problems, primarily due to the different materials used within the energy conversion device.

For instance, FIG. 1A sets forth a typical energy conversion device 10 in which the electrolyte 12 and the cathode 14 are formed of different materials. For example, the electrolyte 12 can be cerium(IV)oxide ($CeO_2$) as is known in oxygen ion systems. The electrolyte ideally serves to transportionic species without significant levels of electronic conductivity so as to avoid deterioration of the device performance. The material of the cathode 14 is a porous, mixed ionic and electronic conducting material such as $(La,Sr)MnO_3$ that allows for both oxygen ion and electron transfer. Solid oxide fuel devices as illustrated in FIG. 1A can also include an anode (not shown in FIG. 1A), e.g., a nickel/ceramic composite, that is porous to allow gas transfer and is stable at low oxygen partial pressure conditions.

Solid fuel devices typically operate at elevated temperatures and are subjected to extreme temperature fluctuations during the heating and cooling steps necessary to achieve a steady state operation. These operation conditions lead to difficulties during operation. One difficulty is inter-diffusion and secondary phase formation at the interfaces between the electrolyte and the cathode. This secondary phase formation degrades the cell performance. A second difficulty concerns cracking and mechanical failure that is contributable to differences in thermal expansion of the materials used to form the cathode, electrolyte, and anode of solid oxide fuel cells.

Other solid fuel cells such as polymer electrolyte membrane (PEM) fuel cells also require electronically conducting layers that resist degradation over long term use. For instance, a significant problem hindering large-scale implementation of PEM fuel cell technology is the loss of performance during extended operation and cycling. Investigations of the deterioration of cell performance have revealed that a considerable part of the performance loss is due to the degradation of the electrocatalyst. High surface area carbon materials such as carbon blacks have found widespread use as a catalyst supports for fuel cells owing to their low cost, good electron conductivity, high surface area, and chemical stability.

While carbon has been proven to be a stable support in the anode environment, it has been shown to be thermodynamically unstable in the cathode environment. When exposed to water and oxygen the carbon supports react to form carbon dioxide ($CO_2$). Sintering and dissolution of the catalyst, generally platinum and platinum alloy, on the carbon surface increases with carbon corrosion. Oxidation of the carbon surface increases hydrophilicity and affects water removal leading to increased mass transport losses. Also, carbon corrosion decreases the thickness of the catalyst layer leading to decrease in the electrical contact between the current collector and subsequent increase in the cell resistance.

The high surface area and surface chemistry of carbon play an important role in the deposition and stability of catalystic metals such as platinum (Pt). Unfortunately, the very properties that make carbon materials good catalyst supports (i.e., high surface area and surface functionality) serve to enhance corrosion at high oxidative potentials. The instability of carbon is accelerated at the current operating conditions of the fuel cell such as high metal loadings (e.g., greater than 10 wt %), high water content, low pH (generally less than 1.0), high temperature, high oxygen concentration, and high operating potentials, particularly those that occur during startup and shutdown cycles.

Accordingly, there remains room for improvement and variation within the art of energy conversion devices. For instance, what are needed in the art are energy conversion devices that provide long term use without degradation due to, e.g., secondary phase formation, disparate thermal expansion characteristics, corrosion, and the like. For instance, the ability to produce highly dispersed and high surface area Pt crystallites is essential to increase the reaction rate of kinetically slow reactions such as the oxygen reduction reaction in a PEM fuel cell. Thus, there exists the need to develop catalytic support materials that afford improved corrosion resistance. Increased corrosion resistance of the catalyst support is required in order for fuel cells to meet the design lifetime requirements of 40,000 hours for stationary applications and 5,000 hours for transportation applications.

SUMMARY OF THE INVENTION

According to one embodiment, disclosed is a solid fuel cell. The solid fuel cell includes an ionically conducting electrolyte and a cathode adjacent to the electrolyte. The cathode includes nanocrystalline cerium oxide. More specifically, the nanocrystalline cerium oxide of the cathode is mixed ionic and electronic conducting cerium oxide.

In another embodiment, disclosed is a solid oxide fuel cell. For instance, the solid oxide fuel cell can include an electrolyte comprising exclusively ionically conducting cerium oxide having a grain size between about 1 and about 5 micrometers, a cathode comprising mixed ionic and electronic conducting cerium oxide having a grain size between about 10 and about 50 micrometers, and an anode.

Also disclosed are methods for forming a solid fuel cell. For example, a method can include forming nanocrystalline cerium oxide having an average diameter of between about 10 and about 50 nanometers, and adjoining a first layer comprising the nanocrystalline cerium oxide to a second layer, the second layer being exclusively ionically conducting.

BRIEF DESCRIPTION OF THE DRAWINGS

FIG. 1A sets forth a prior art cathode/electrolyte interface using two different materials for the respective cathode and electrolyte.

FIG. 1B sets forth a cathode and electrolyte interface using fine grain $CeO_2$ for an electrolyte and nanocrystalline size grains of $CeO_2$ for the porous cathode structure.

FIG. 1C sets forth an anode, a cathode, and an electrolyte in accordance with an aspect of the present invention.

FIG. 2 is a graph setting forth various properties of $CeO_2$ materials based upon grain size.

FIG. 5 displays the X-ray spectra of the bare porous cerium oxide substrate (FIG. 5A) and following sputtered and sol-gel cerium oxide film deposition (FIG. 5B).

FIG. 6 presents an scanning electron microscope image (SEM) of a view of a porous $CeO_2$ porous substrate, a 1 µm sputtered $CeO_2$ layer and a dense sol-gel $CeO_2$ layer (FIG. 6A) and a closer view of the sputtered $CeO_2$ layer and the dense sol-gel $CeO_2$ layer (FIG. 6B).

DESCRIPTION OF THE PREFERRED EMBODIMENT

Figure 3:
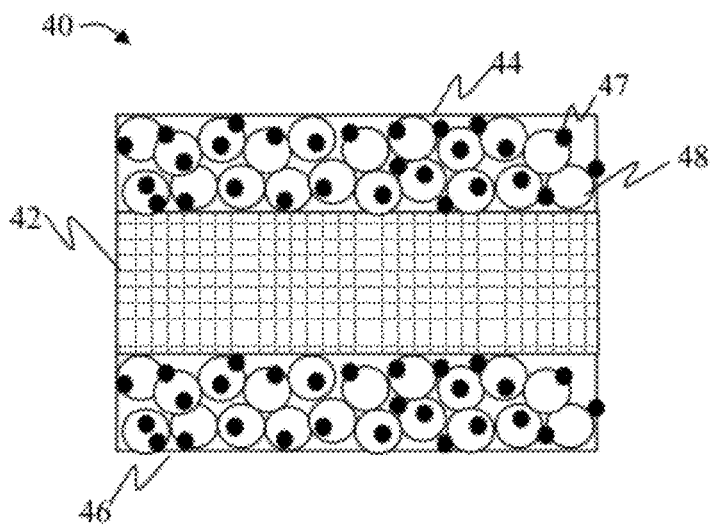
FIG. 3 sets forth a portion of a PEM solid fuel cell as described herein.

Reference will now be made in detail to embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is one aspect of at least one of the embodiments to provide for a cathode for an energy conversion device having a porous nanocrystalline grain structure of $CeO_2$ having an average grain size of 50 nm.

It is a further aspect of at least one embodiment of the present invention to provide for an energy conversion device in which the cathode and the electrolyte interface is comprised of the same material, thereby preventing cathode and electrolyte degradation contributable to different materials having different thermal expansion properties.

It is a further aspect of at least one embodiment of the present invention to provide for an energy conversion device having an electrolyte and a cathode interface, both comprising $CeO_2$, with the cathode further having a grain size of substantially about 50 nm.

It is a further aspect of at least one embodiment of the present invention to provide for a process of using nanocrystalline grains of $CeO_2$ to form a cathode for an energy conversion device.

It is a further aspect of at least one embodiment of the present invention to provide for an energy conversion device having a catalyst support comprising nanocrystalline grains of $CeO_2$.

In general, the present disclosure is directed to energy conversion devices that include nanocrystalline $CeO_2$. $CeO_2$ exhibits a drastic increase in the electronic conductivity of nanocrystalline samples near atmospheric oxygen pressure. In contrast, bulk $CeO_2$ having a grain size on the micrometer scale shows exclusively ionic conductivity. The result of increased electronic conductivity in nanocrystalline $CeO_2$ results in "mixed conductivity," including both significant electronic and ionic contributions. One of the implications of this phenomenon is the ability of the nanocrystalline material to separate oxygen from air using only the chemical potential gradient of oxygen as the driving force, without the application of an external bias field as is required in oxygen "pumps" often based on zirconia and other ceria materials.

FIG. 2 presents properties of bulk (i.e., micron grain size) and nanocrystalline $CeO_2$ materials (Chiang, Y. M., et al., Defect and transport properties of nanocrystalline CeO2-x. Applied Physics Letters, 1996. 69(2): p. 185-187). At elevated temperatures near 800° C., the conductivity of nanocrystalline $CeO_2$ in air/cathode conditions and low pressure $P_{O2}$/fuel side conditions (partial pressure of oxygen $(P_{O2})$ from 0.21 atm to $10^{-5}$ atm) approaches 1 S/cm. Accordingly, energy conversion devices including nanocrystalline $CeO_2$ can be beneficially utilized in both high and low $P_{O2}$ modes.

In one embodiment, the energy conversion device can be a solid oxide fuel cell, an example of which is illustrated in FIG. 1B. Solid oxide fuel cell 20 includes an electrolyte 22 and a cathode 24 that are both formed of $CeO_2$, but with different grain sizes. More specifically, the cathode is formed of nanocrystalline $CeO_2$ having a grain size on the nanometer scale such that the electrolyte/cathode interface is formed using differently sized particles of $CeO_2$. The use of the same material with different grain sizes (alternatively referred to throughout this disclosure as particle sizes) can provide an improved electrolyte/cathode structure and interface. For instance, the electrolyte/cathode structure avoids both interdiffusion and secondary phase formation at the electrolyte/cathode interface as well as mechanical failure due to thermal expansion characteristics of two different materials that are commonly associated with energy conversion devices operating at elevated temperatures and/or that are subject to wide temperature fluctuations.

In general, the grain size of the nanocrystalline $CeO_2$ for use in an energy conversion device can be less than about 100 nanometers in average diameter, less than about 50 nanometers in average diameter, or less than about 40 nanometers in average diameter. In one embodiment, the nanocrystalline $CeO_2$ can have an average diameter of between about 10 nanometers and about 50 nanometers. By way of example, the cathode 24 of FIG. 1B can be constructed of $CeO_2$ having a grain size of approximately 50 nm. Such a grain size can enhance the electronic conductivity of the cathode. While variations upward or downward of about 50 nanometers are encompassed in the energy conversion devices, it has been found a size of about 50 nanometers is effective to meet the desired function of mixed ionic and electronic conduction.

The nanocrystalline $CeO_2$ may be fabricated by any suitable process so as to form a layer including porous nanocrystalline grains of $CeO_2$. More specifically, an energy conversion device layer may be formed according to any suitable process that includes alloying a porous layer of nanocrystalline grains of $CeO_2$ on to a second layer of the device. For instance, in one embodiment, the layer including nanocrystalline $CeO_2$ can be alloyed on to an electrolyte layer that includes exclusively ionically conducting $CeO_2$.

By way of example, nanocrystalline $CeO_2$ thin films can be fabricated by use of sol-gel, sputtering, spray pyroloysis, pulsed laser deposition (PLD), or chemical vapor deposition (CVD), as are known in the art and have been utilized to achieve dense nanocrystalline $CeO_2$ layers in other applications. In one embodiment, a spark plasma sintering technique as has been utilized for producing other dense nanocrystalline ceramics can be utilized to form a $CeO_2$ layer on a substrate, e.g., a $CeO_2$ electrolyte layer.

A sol-gel method similar to that described by Kagomiya, et al. (*Electrochem. Solid-State Lett.*, 8, A70 (2005)) that has been used to deposit Gd doped $CeO_2$ and $CoFe_2O_4$ spinel composite thin films on ceramic substrates of the same composition can be utilized. For example, a sol-gel precursor solution including cerium III acetylacetonate in an acetic acid/water solvent can be utilized. Other $CeO_2$ precursors may optionally be utilized, such as cerium acetate or cerium nitrate. The concentration and/or precursors of the solution may be adjusted as necessary to account for the tendency of $CeO_2$ to agglomerate and/or precipitate in solution. The precursor solution can be spin coated onto an adjacent layer of the fuel cell, e.g., the electrolyte layer, followed by pyrolysis and annealing in a box furnace according to standard practice.

The layer including nanocrystalline $CeO_2$ can have a mixed ionic and electronic conductivity as may be evidenced by the oxygen flux through the layer. For instance, the layer can have an oxygen flux at 800° C. of greater than about 0.001 $\mu mol/cm^2$-sec, greater than about 0.01 $\mu mol/cm^2$-sec, greater than 0.05 $\mu mol/cm^2$-sec, or greater than about 0.1 $\mu mol/cm^2$-sec. In one embodiment, the layer including nanocrystalline $CeO_2$ can have an oxygen flux at 800° C. of about 0.014 $\mu mol/cm^2$-sec. The appreciable levels of oxygen flux of the nanocrystalline $CeO_2$ layer confirms mixed ionic and electronic conductivity. In one embodiment, the maximum oxygen flux for the nanocrystalline $CeO_2$ layer can correspond to the maximum ambipolar conductivity of the layer.

In general, the layer including the nanocrystalline $CeO_2$ need not include any dopants. The inclusion of dopants in a layer is not prohibited in the devices, however, provided the inclusion of a dopant does not materially affect the desired characteristics of the layer including the nanocrystalline $CeO_2$. For instance, when forming a cathode layer on a solid oxide fuel cell, the cathode layer including nanocrystalline $CeO_2$ should not include a gadolinium dopant, as may be found in a $CeO_2$ electrolyte, as this dopant would decrease the electrical conductivity of the cathode.

Referring again to FIG. 1B, the device 20 includes an electrolyte 22 adjacent to the cathode 24. The electrolyte 22 is constructed of an exclusively ionic conducting $CeO_2$ such as micron grain sized $CeO_2$. As utilized herein, the term 'micro grain sized' generally refers to particles having an average diameter of greater than about 1 micrometer, for instance between about 1 and about 10 micrometers, or between about 1 and about 5 micrometers. The resulting combination of the electrolyte and the cathode provides solid oxide fuel cell components formed of a single $CeO_2$ material, but with each layer providing a different function to the fuel cell.

The $CeO_2$ electrolyte can be doped or undoped $CeO_2$ and may be made from conventional processing techniques including, without limitation, ball milling, sintering, tape casting and combinations thereof. Such conventional processing, e.g., ball milling followed by sintering at temperatures on the order of about 1500° C., can provide a target grain size for the electrolyte on the order of from about 1 to about 5 micrometers. Other methods as are known in the art may be utilized to form the $CeO_2$ electrolyte layer such as, without limitation, physical vapor deposition (PVD) methods such as reactive DC magnetron sputtering, plasma assisted electron beam evaporation, pulsed laser deposition, aerosol-assisted metalo-organic vapor deposition, and the like. Dopants as may be incorporated in the electrolyte layer can include, without limitation, scandium (Sc), ytterbium (Yb), gadolinium (Gd), samarium (Sm), or a combination thereof.

The solid oxide fuel cell can also include an anode. For instance, the solid oxide fuel cell can include a porous cermet anode as is generally known in the art. In one embodiment, the anode can be a nickel/yttria-stabilized zirconia (YSZ) anode. The anode can be formed according to standard formation methodology. For instance, the anode may be formed according to powder technology processes. For example, in formation of an Ni-YSZ anode, a slurry of nickel can be applied to a surface of the cell, e.g., a surface of the interconnect, and then YSZ can be deposited according to an electrochemical vapor deposition process. In another embodiment, an Ni-YSZ slurry may first be formed and this slurry may be applied to a surface. Nickel oxide can also be used to form the slurry, with the nickel oxide being reduced to particulate nickel during sintering.

Optionally, a slurry can include one or more fillers such as starch, carbon, or a resin that can burn out during sintering to form the desired porosity in the anode. In another embodiment, a freeze-drying process can be used in which the slurry is freeze-dried followed by sublimation of the ice from the anode prior to sintering.

In one embodiment, a standard anode as is known in the art, e.g., an Ni-YSZ anode can serve as a structural support for the remaining layers of the fuel cell. For instance, the anode can be first formed, and the electrolyte layer and cathode layer can then be formed on the supporting anode layer.

According to one embodiment a $CeO_2$ fuel cell may be provided having a monolithic material structure in which all of the electrolyte, the cathode, and the anode are formed of $CeO_2$. For example, FIG. 1C illustrates a fuel cell 30 in which the $CeO_2$ electrolyte 32 includes microcrystalline particles while nanocrystalline particles are used for both the $CeO_2$ anode 36 and for the $CeO_2$ cathode 34. The $CeO_2$ anode 36 can be formed according to methods as described above for the cathode, and can be formed according to the same or a different procedure as the cathode. In another embodiment, the anode can also include $CeO_2$ nanocrystalline materials, but may differ from the cathode in another fashion. For instance, the anode can be a Ni—$CeO_2$ anode, comparable to an Ni-YSZ anode discussed previously, but utilizing $CeO_2$ instead of the YSZ. The utilization of the nanocrystalline porous $CeO_2$ in the anode can provide improvements over previously known nickel-based anodes in terms of both mechanical stability and chemical compatibility with a $CeO_2$—based electrolyte.

A solid oxide fuel cell can generally be utilized in a stacked arrangement as is known in the art. For instance, a plurality of solid oxide fuel cells can be stacked with one another including an interconnect between each cell. An interconnect can generally be either a metallic layer, a ceramic layer, or a cermet layer as is known in the art that can be exposed simultaneously to the reducing environment of the anode and the oxidizing environment of the cathode. Interconnect materials can include, without limitation, metal alloys such as nickel or ferritic steel based alloy, stainless steel, $LaCrO_3$ doped with a rare earth element such as Ca, Mg, Sr, or the like, Ca-doped yttrium chromite, and so forth.

In one embodiment, the electrodes and electrolyte of a solid oxide fuel cell can be formed without the use of dopant chemistry to achieve the desired levels of ionic/electronic conductivity and/or without the use of metallic face coatings to provide a dual ionic/electronic functionality to the cathode. The ability to use one material for the formation of a cathode, anode, and electrolyte can be achieved by controlling the respective grain size of the components to achieve the desired but different functionality with respect to the various parts.

Solid fuel cells including a layer of nanocrystalline $CeO_2$ are not limited to solid oxide fuel cells as illustrated in FIG. 1. In one embodiment, nanocrystalline $CeO_2$ can function as a catalyst support in a PEM solid fuel cell. A PEM solid fuel cell includes the polymer electrolyte membrane to provide ion exchange between the cathode and anode. During use, the fuel is supplied to the fuel cell's anode and oxygen is supplied to the cell's cathode. Both of the cathode and anode can include a catalyst layer, e.g., a platinum catalyst. The catalyst layer can also include a catalyst support that includes nanocrystalline $CeO_2$. Catalyst supports provide sites for the anchoring of the catalyst particles and an electron conductive path for the transport of electrons, while the ion conductive path is mostly provided by the ionomer inside the catalyst layer. Use of nanocrystalline $CeO_2$ as catalyst support can prevent corrosion of the support as has been seen with carbon support materials, particularly on the cathode of the devices. Corrosion of the catalyst support results in the detachment of the platinum nanoparticles from the support. This causes a loss of the electron conductive pathway and catalytic surface area due to the sintering of the platinum nanoparticles.

Utilization of nanocrystalline supports in solid fuel cells can offer multiple benefits to the devices. For instance, enhancements in performance through appropriate microstructures may lead to reduced catalyst loading and lower membrane electrode assembly (MEA) formation costs. Additionally, ceria-based metal oxide materials offer the possibility of stability to oxidative cathode corrosion and high conductivity and stability at low oxygen partial pressure and as such can be utilized beneficially for both cathode and anode support materials, which can lead to simplification of a large scale MEA production process.

FIG. 3 illustrates one embodiment of a portion of a PEM solid fuel cell 40. A PEM fuel cell can be designed for gaseous or liquid fuels including, without limitation, hydrogen and methanol. Solid fuel cell 40 includes anode 46 at the fuel side and cathode 44 at the oxygen side. Anode 46 is separated from cathode 44 by the PEM 42. PEM 42 provides for ion transport to facilitate reactions in the fuel cell 40. In one arrangement, close contact between each electrode 44, 46 and the PEM 42 can provide essentially continuous polymeric contact for ion transfer. For example, one or both electrodes 44, 46 can be inset or at least partially embedded in the PEM 42.

The PEM 42 can be any suitable ion conductive polymeric material as is known in the art. PEM membranes encompassed herein include those described in U.S. Pat. No. 4,272,353 to Lawrance, et al., U.S. Pat. No. 3,134,697 to Niedrach, and U.S. Pat. No. 5,211,984 to Wilson, all of which are incorporated herein by reference. The PEM polymer(s) include ionic groups in the polymeric structure; one ionic component of which is fixed or retained by the polymeric matrix and at least one other ionic component being a mobile, replaceable ion that is electrostatically associated with the fixed component. The ability of the mobile ion to be replaced under appropriate conditions with other ions imparts ion exchange characteristics to the fuel cell.

The PEM 42 can be prepared according to known methods by polymerizing components, at least one of which is an ionic constituent. One broad class of cation exchange, proton conductive polymers as may be utilized is sulfonic acid cation exchange polymers. In sulfonic acid-based membranes, the cation ion exchange groups are hydrated sulfonic acid radicals that are attached to the polymer backbone by sulfonation. In one embodiment, the PEM 42 can be a perfluorinated sulfonic acid polymer electrolyte in which the entire membrane structure has ion exchange characteristics.

PEM materials are commercially available, for instance membranes available from E.I. Dupont de Nemours & Co., under the trade designation Nafion® that are prepared from copolymers of tetrafluoroethylene and perfluorinated monomers containing sulfonic or carboxylic acid groups.

The electrodes 44, 46 include an active material which engages in cell reactions. Electrochemical reactions in the PEM fuel cell 40 occur in an interface region among the proton conductive ionomer of the PEM 42, a catalyst, an electron-conducting catalyst support, and the gaseous reactant. Thus, for good catalyst utilization, the electrode can be designed so that the catalyst sites are in intimate contact with the proton exchange membrane, the gaseous reactant, and the electron-conducting catalyst support.

The electrodes 44, 46 include nanocrystalline $CeO_2$ particles 48 that function as a support for the catalyst 47. The catalyst 47 is generally a metallic catalyst, either a metal or a metal alloy. In one embodiment, the catalyst 47 can be a noble metal catalyst such as platinum (Pt) and palladium (Pd). However, other relatively stable metals can be used, including those suitable for alloying. Examples include titanium, ruthenium, rhodium, tungsten, tin, molybdenum, or combinations thereof. It should be understood that though the cathode 44 and the anode 46 of the PEM fuel cell 40 both include nanocrystalline $CeO_2$, this is not a requirement of the disclosed fuel cells, and in other embodiments, the anode may differ in composition from the cathode.

The nanocrystalline $CeO_2$ particles 48 and catalyst 47 can be formed separately and then combined prior to formation of the electrodes 44, 46. By way of example, an aqueous solution of a cerium oxide precursor, e.g., an aqueous cerium acetate solution or cerium nitrate solution, can be processed according to a reactive deposition process such as a spray pyrolysis technique. According to this technique, the precursor solution, which can include additional processing aids such as complexing agents and the like, can be fed into a rotating furnace via a nozzle at a suitable feed rate, e.g., about 5 to about 10 liters/hour. The atomized precursor solution will dry and decompose at the hot zone temperature, generally less than about 1200° C., to form the metal oxide. The $CeO_2$ particles can then be collected, for instance in a cyclone, and further processed with the catalyst of choice to form the composite particles. Deposition of platinum nanoparticles on the $CeO_2$ support may take place using a deposition-precipitation method. For example, the support can be submerged in $H_2O$. A salt solution of the catalyst, such as a platinum salt solution, can be prepared in a separate container. The pH of the $CeO_2$ support suspension can be adjusted to the basic region using, e.g., a dilute potassium hydroxide solution. The catalyst solution can then be added drop-wise to the slurry resulting in precipitation of platinum onto the $CeO_2$ supports. The catalysts may be dried overnight before reduction in hydrogen atmosphere to produce the composite particles including $CeO_2$ nanocrystalline support and the catalyst.

According to another embodiment, composite particles including the $CeO_2$ and the catalyst can be formed in a single-step operation. For instance, a reactive deposition technique, such as a sol-gel deposition process, a spray pyrolysis process, or the like, can be carried out in which the precursor solution is formed to include the catalyst.

The composite particles including the nanocrystalline $CeO_2$ particles 48 and the catalyst 47 can be combined with a proton conductive binder, for instance in solution with a casting solvent. The solution can be applied directly to the PEM 42 or can be applied to another layer of the fuel cell, for instance a conductive layer such as a conductive graphite sheet (not shown in FIG. 3). Following application, the casting solvent can be evaporated to form the electrode 44, 46. In those embodiments in which the composite particles including the nanocrystalline $CeO_2$ particles 48 and catalyst 47 are applied to a layer of the fuel cell other than the PEM 42, this layer can be applied to the PEM 42, for instance via hot pressing. Following application, the nanocrystalline $CeO_2$ particles 48 and catalyst 47 can be in intimate contact with and adhered to the PEM 42.

Beneficially, due to the characteristics of the nanocrystalline $CeO_2$ support, the PEM fuel cell can be formed with less catalyst than has been necessary for previously known PEM fuel cells such as those that utilize a carbon-based catalyst support. For example, a typical loading level of platinum catalyst can be about 0.4 $mg/cm^2$. Through utilization of a nanocrystalline $CeO_2$ support, which can limit both catalyst agglomeration and performance degradation as has been problematic with carbon-based supports in the past, it is believed that catalyst loading can be reduced by about 5%, about 10%, or even more. For instance, a PEM fuel cell incorporating $CeO_2$ support in the catalyst can have a catalyst loading level of about 0.38 $mg/cm^2$, or even less in other embodiments, for instance less than about 0.36 $mg/cm^2$, or less than about 0.35 $mg/cm^2$.

The present disclosure may be better understood with reference to the Example, below.

Example

Sample preparation and characterization. Porous $CeO_2$ substrates were prepared by ball milling cerium oxide (obtained from High Purity Chemical Co., Japan) with 7 wt % carbon powder (NICABEADS®, Nippon Carbon Co., Ltd., Japan) in ethanol for 24 h. After drying and sieving, the powder was mixed with a binder and uniaxially pressed into pellets of 16 mm diameter with a force of 20 kN and sintered at 1500° C. for 6 h in air. The sintered ceramic samples had relative densities of 70% (30% porous) with pore sizes of 1 to 3 μm and a physical gas flux greater than 2 μmõl/cm²-s.

A layer of cerium oxide was the sputter deposited onto the polished porous substrate surface in order to inhibit sol-gel solution leakage into the porous substrate. Sputtering was performed on a JEOL, Tokyo, Japan (JEC-SP360M) system at 200 W and 0.5 Pa of Ar gas at room temperature using a cerium oxide target.

The final step in sample preparation was the chemical solution deposition of a ceria sol onto the porous substrate and blocking layer. Concentrations of a deposition solution exceeding 0.2 M prepared with cerium acetate and acetylacetonate solutions in acetic acid/water (ratio 2:1) were found to be unstable. A solution including cerium III acetylacetonate (Aldrich, USA, chemicals) in an acetic acid/water solvent was formed. The precursor was mixed with 30 mL of acetic acid and 15 mL of deionized water, heated to 120° C. and held under reflux conditions for 1 h, resulting in a clear yellow colored solution. The solution was deposited by spin coating onto the porous cerium oxide substrates with a predeposited cerium oxide buffer layer at 3000 rpm for 30 s, followed by drying for 3 min at 100° C. and pyrolysis for 3 min at 350° C. This procedure was repeated ten times before heat-treatment in a box furnace to 800° C. for 30 min in air. The process was repeated to obtain multilayer films consisting of 60 sol-gel layers. The final film thickness was nominally 500 nm.

Thin film development of cerium oxide by sol-gel and sputtering methods were performed on PtSi substrates with rapid thermal annealing to 800° C. for 10 min in air following film deposition.

The crystal structure of the ceramics and thin films were examined by X-ray diffraction (Philips, XRD, Tokyo, Japan, X-pert), and the microstructure was examined by SEM (JEOL). The mean grain size was determined by an average of 50 grains using the software package ImageJ available from the National Institutes of Health.

Oxygen flux measurement. Oxygen flux measurements were performed by placing the sample between two quartz tubes using a glass ring (melting point 620° C.) for gas sealing and a metal spacer with a diameter of 5 mm to control the area of gas flux. Air at 1 atm was supplied to the bottom of the porous substrate (feed side), while flowing He at 20 sccm was supplied to the permeate side (film surface). The gas concentrations of $O_2$ and $N_2$ were measured on the permeate side using a gas chromatograph (GC323; GL Sciences Co. Ltd., Tokyo, Japan). The leakage of oxygen was calculated by measuring the volume of $N_2$ gas from air on the permeate side. The oxygen permeation flux was corrected using the total measured oxygen on the permeate side minus the physical leakage of oxygen. Leakage of air was not completely eliminated, most likely due to possible cracks or damage to the thin film surface during the glass sealing process and/or remaining low levels of porosity in the film. However, the physical leakage of oxygen comprised less than 10% of the total concentration of oxygen measured on the permeate side at 800° C. The leakage was constant with temperature (as measured by the $N_2$ concentration), while the oxygen concentration increased due to increased oxygen transport through the membrane. The oxygen concentration measured on the permeate side at 800° C. was 0.012% corresponding to an oxygen partial pressure $P_{O2}$ of $10^{-4}$ atm. The concentrations of oxygen and nitrogen measured were well within the calibrated range for the GC, and a repetition of these results on numerous samples confirmed that the majority of oxygen detected was in fact due to oxygen transport through the cerium oxide film.

The measurement of the oxygen flux through the sample can be formally described by the Wagner equation (1):

$$J(O_2) = \frac{RT}{16F^2L} \int_{lnP(O2)'}^{lnP(O2)''} \frac{\sigma_i \sigma_e}{\sigma_i + \sigma_e} d\ln P(O2) \tag{1}$$

where $\sigma_i$ and $\sigma_e$ are the ionic and electronic conductivities, P(O2)' and P(O2)" are the oxygen partial pressure on the feed and permeate sides, respectively, T is the temperature in kelvin, R is the gas constant, F is the Faraday constant, and L is the membrane thickness.

Surface effects have the potential to be the rate determining step and can be described by a modification of Eq. (1) to include a characteristic length, below which a decrease in the thickness does not lead to an increase in measured oxygen flux. In ceria-ferrite based composite ceramic membranes with micrometer size grains fabricated by conventional ceramic processing, significant limitations due to surface exchange kinetics were observed at membrane thicknesses less than L=0.5 mm under a large oxygen partial pressure gradient from Ar-5% $H_2$ to air. Under a less severe oxygen partial pressure gradient from He to air used this example, as well as the much reduced oxygen fluxes obtained in this example, the characteristic length would be smaller than this value and the oxygen flux should be controlled by bulk diffusion. In general, the characteristic length depends on the ratio of surface exchange to bulk diffusion of the ionic species and has been reported to range from hundreds of nanometers to thousands of micrometers, depending on the material system, microstructure, morphology, and measurement conditions. Recent data on the thickness dependence of nanocrystalline ceria-ferrite thin film membranes on porous substrates similar to films fabricated in this example have demonstrated that the oxygen flux is inversely proportional to the membrane thickness, even with thicknesses in the range of 2 μm.

Using the assumption in nanograin ceria that $\sigma_e > \sigma_i$, Eq. (1) may be rearranged to give an estimate of the ionic conductivity from the measured oxygen flux:

$$\sigma_i = \frac{J(O2)}{\ln\left(\frac{P(O2)'}{P(O2)''}\right)} \frac{16F^2 L}{RT} \quad (2)$$

where $\sigma_1$ is the ionic conductivity (S/m) assumed P(O2) independent, J(O2) is the oxygen permeation flux (mol/m²-s), R is the gas constant (8.1314 J/mol-K), T is the temperature (Kelvin), F is the Faraday constant (96.485 C/mol), L the thickness of the membrane (500 nm) and P(O2)' and P(O2)" are the oxygen partial pressures on the feed and permeate sides. The concentration of gas at the permeate sides P(O2)" in the argon sweep gas was determined by the GC and was subsequently used as the oxygen partial pressure "driving force" for ionic conduction.

Initial experiments indicated that sputtered layers of 1 μm in thickness on porous cerium oxide substrates were ineffective in preventing air leakage during oxygen permeation measurements. Therefore, dense layers of cerium oxide were deposited by a sol-gel method on the surface of the sputtered cerium oxide. This composite structure had the advantage of reduced solution leakage into the substrate with a sputtered layer, as compared to the substrate itself.

Figure 4:
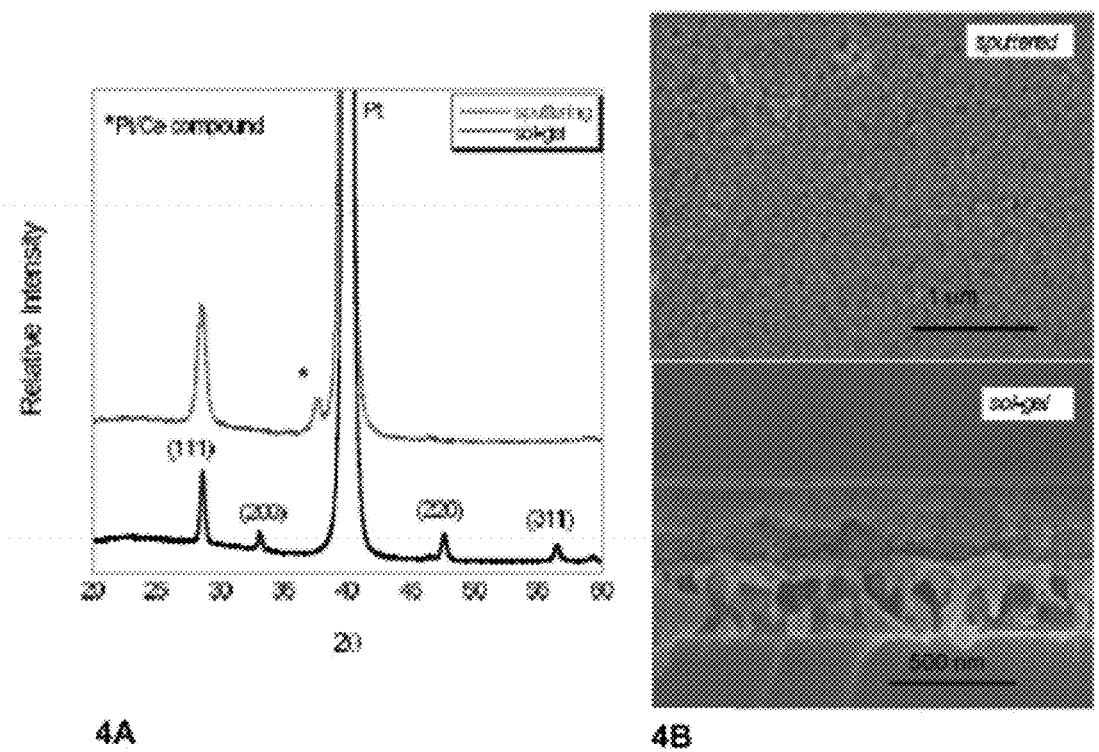
FIGS. 4A and 4B display the X-ray and SEM determined microstructure for ceria films fabricated by sol-gel and sputtering methods onto PtSi substrates.

Since films of cerium oxide were required from both sol-gel and sputtering methods for the samples, the films were characterized separately on P̃tSi substrates. FIGS. 4A and 4B display the X-ray and SEM determined microstructure for ceria films fabricated by sol-gel and sputtering methods onto P̃tSi substrates. The X-ray diffraction spectrum of the sol-gel film shows peaks from ceria and the Pt substrate, while sputtered films show the presence of a PtCe compound, most likely due to the increased energies of the sputtering process. The microstructure of the films was dense with nanometer size grains.

FIG. 5 displays the X-ray spectra of the bare porous cerium oxide substrate (FIG. 5A) and substrate following sputtered and sol-gel cerium oxide film deposition (FIG. 5B). The X-ray broadening observed is indicative of the reduced grain size of cerium oxide thin films, as compared to the ceramic substrate. The microstructure of the film/ceramic substrate is shown in FIG. 6. In FIG. 6A is seen a expanded view of the substrate with micrometer size pores due to carbon burnout during sintering. The sputtered cerium oxide buffer layer can also be seen to grow in a columnar fashion up from the substrate/film interface. A close-up of the dense sol-gel derived cerium oxide film and the sputtered cerium oxide buffer layer is shown in FIG. 6B, clearly showing the columnar nature of the sputtered layer with a mean column diameter of 90 nm and the dense sol-gel layer with a mean grain size of 50 nm and a nominal film thickness of 500 nm.

Figure 7A:
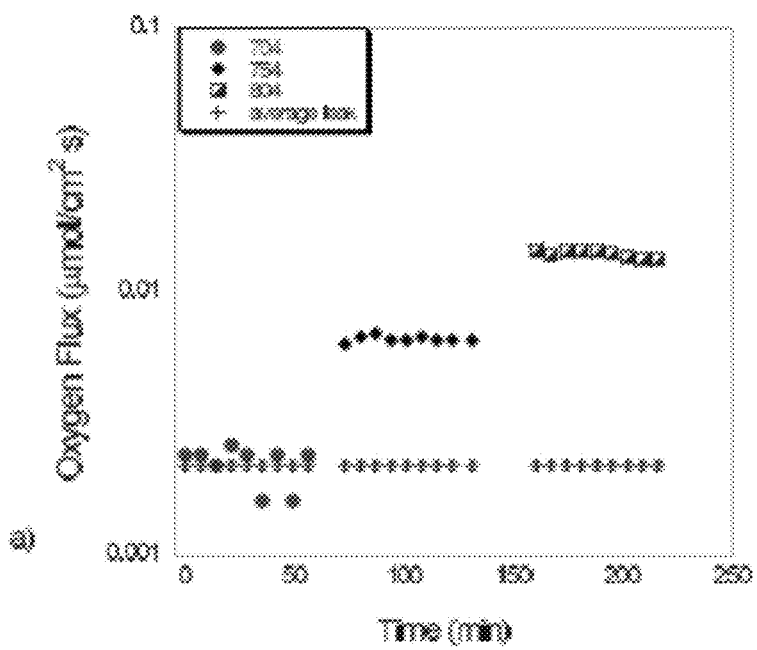
FIG. 7A presents the oxygen flux characteristics for a nanocrystalline $CeO_2$ film on a porous substrate.
Figure 7B:
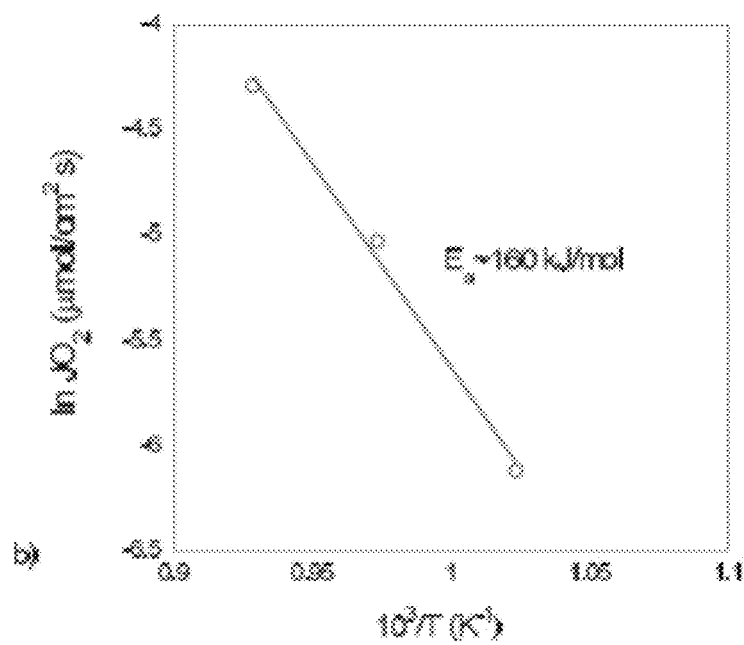
FIG. 7B shows the activation energy for oxygen flux through a nanocrystalline $CeO_2$ membrane.

The oxygen flux characteristics for the nanocrystalline $CeO_2$ film on a porous substrate are presented in FIG. 7A. At low temperatures near 654° C. it is seen that the oxygen concentration in the permeate side from oxygen flux through the membrane is approximately equal to the amount of oxygen in air that passed through as leakage. As the temperature increased to 804° C., the oxygen flux due to oxygen transport through the membrane increased an order of magnitude to 0.014 μmol/cm², while the amount of oxygen due to leakage remained constant, accounting for less than 10% of the total measured oxygen concentration on the permeate side at 804° C. FIG. 7B shows the activation energy for oxygen flux through the thin $CeO_2$ membrane, determined from the logarithm of oxygen flux versus reciprocal temperature to be approximately 160 kJ/mol.

The ionic conductivity of the films fabricated in this example calculated from the modified Wagner relation equation (1) were on the order of $10^{-7}$ S/cm, a value significantly less than bulk ceramics. The ionic conductivity in undoped ceramics is on the order of $10^{-4}$ S/cm, while highly aliovalent doped cerium oxide can approach $10^{-1}$ S/cm at 800° C. The trend of a decrease in ionic conductivity with decreasing grain size is consistent with space charge effects induced adjacent to positively charged grain boundary cores, resulting in the depletion of oxygen vacancies.

Figure 8:
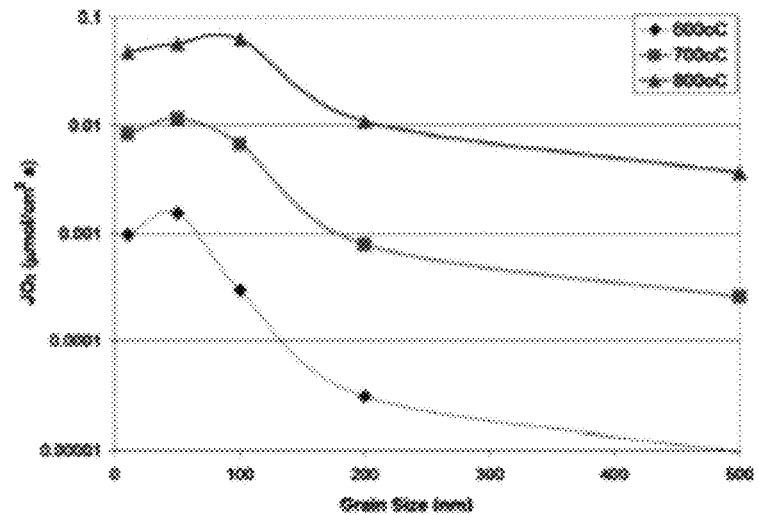
FIG. 8 displays predictions of the oxygen flux versus grain size and temperature.

While not wishing to be bound to any particular theory, it is believed that through variation in preparation routes, the oxygen permeation values reported in this example could potentially be enhanced with an increase in the ionic conductivity to levels near $10^{-5}$-$10^{-3}$ S/cm with the concomitant elevated electronic conductivity expected in nanocrystalline ceria. For instance, a physical vapor deposition process could provide a layer with fewer unexpected dopant impurities as compared to a wet solution chemistry method as utilized here. FIG. 8 displays predictions of the oxygen flux versus grain size and temperature using literature data (Tschope, et al., *J. Electroceram.*, 7, 169 (2001)) and Eq. (1) for a 500 nm thick film in the absence of surface limitations. The conductivities were assumed to be independent of oxygen partial pressure over the range from 0.21 to $10^{-5}$ atm $P_{O2}$. The temperature dependence of the conductivities was calculated using an ionic activation energy of 97 kJ/mol and an electronic activation energy of 222 kJ/mol for large grain size material down to 100 nm. Grain sizes below 50 nm utilized an ionic activation energy of 153 kJ/mol and an electronic activation energy of 125 kJ/mol. The maximum of predicted oxygen flux between 50 and 100 nm grain size corresponds to the maximum ambipolar conductivity, resulting in flux values near 0.06

μm/cm²-s at 800° C. compared to experimentally determined flux of 0.014 μm/cm²-s presented in this work.

Figure 9:
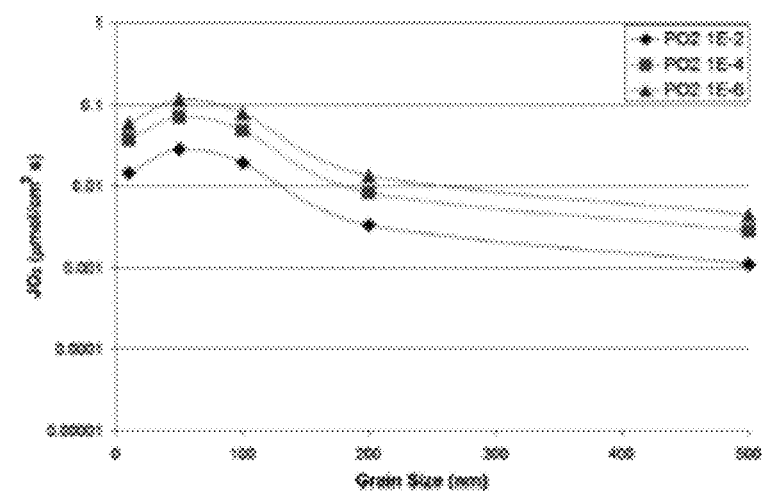
FIG. 9 shows the impact of oxygen partial pressure driving force on the predicted permeation of nanocrystalline $CeO_2$ membranes at 800° C.

FIG. 9 shows the impact of oxygen partial pressure driving force on the predicted permeation of nanocrystalline $CeO_2$ membranes at 800° C. The flux predictions were calculated given a constant feed side partial pressure of 0.21 atm, while the downstream concentration (partial pressure) of oxygen was varied between $10^{-2}$ and $10^{-6}$ atm, resulting in an oxygen flux varying from 0.028 to 0.114 μm/cm². In the absence of surface limitations, it was observed that the oxygen flux could exceed 1 μm/cm²-s for films with ionic conductivities on the order of $10^{-3}$ S/cm, approaching the flux target of oxygen/air separation membranes by using solely $CeO_2$ as a single material system.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention as set forth in the description. In addition, it should be understood that aspects of the various embodiments may be interchanged, both in whole and in part. Therefore, the spirit and scope of the invention should not be limited to the description of the preferred versions contained therein.

What is claimed is:

1. A solid fuel cell comprising:
   an ionically conducting electrolyte; and
   a cathode adjacent to the electrolyte, the cathode having a thickness, the cathode comprising nanocrystalline cerium oxide across the entire thickness of the cathode, wherein the nanocrystalline cerium oxide is mixed ionic and electronic conducting cerium oxide and wherein the nanocrystalline cerium oxide is the sole ionic conductor across the thickness of the cathode and the nanocrystalline cerium oxide is the sole electronic conductor across the thickness of the cathode.

2. The solid fuel cell according to claim 1, the electrolyte comprising cerium oxide.

3. The solid fuel cell according to claim 2, the electrolyte comprising micro-grain sized cerium oxide.

4. The solid fuel cell according to claim 3, wherein the micro grain sized cerium oxide has an average diameter of between about 1 and about 5 micrometers.

5. The solid fuel cell according to claim 2, wherein the electrolyte comprises undoped cerium oxide.

6. The solid fuel cell according to claim 1, wherein the nanocrystalline cerium oxide has an average diameter grain size of between about 10 and about 50 nanometers.

7. The solid fuel cell according to claim 1, wherein the nanocrystalline cerium oxide has an average diameter grain size of about 50 nanometers.

8. The solid fuel cell according to claim 1, the solid fuel cell further including an anode.

9. A method for forming the solid fuel cell of claim 1 comprising:
   forming the nanocrystalline cerium oxide, the nanocrystalline cerium oxide having an average diameter of between about 10 and about 50 nanometers; and
   adjoining a first layer comprising the nanocrystalline cerium oxide to a second layer, the second layer being exclusively ionically conducting.

10. The method according to claim 9, the second layer comprising micro-grain sized cerium oxide.

11. The method according to claim 9, the method further comprising adjoining a third layer to the second layer such that the second layer is between the first and third layers.

12. The method according to claim 9, comprising forming the first layer on a surface of the second layer.

13. The solid oxide fuel cell according to claim 8, wherein the anode comprises nanocrystalline cerium oxide.

14. The solid oxide fuel cell according to claim 13, wherein the cerium oxide of the cathode, the anode and the electrolyte are undoped.

15. The solid oxide fuel cell according to claim 13, wherein the electrolyte, the cathode, and the anode form a single material system, the cerium oxide of the electrolyte, the anode and the cathode differing from one another only by grain size.

16. The solid oxide fuel cell according to claim 2, wherein the cerium oxide of the electrolyte and the cathode are undoped.

* * * * *